United States Patent [19]
Clurman

[11] 3,988,653
[45] Oct. 26, 1976

[54] REDUCTION OF HUNTING IN SYNCHRONOUS MOTOR

[75] Inventor: Stanley Paul Clurman, Cherry Hill, N.J.

[73] Assignee: RCA Corporation, New York, N.Y.

[22] Filed: Apr. 20, 1972

[21] Appl. No.: 245,909

Related U.S. Application Data

[63] Continuation-in-part of Ser. No. 133,572, April 13, 1971, abandoned.

[52] U.S. Cl. ............................................. 318/184
[51] Int. Cl.² ........................................... H02P 5/28
[58] Field of Search ........... 318/174, 175, 176, 178, 318/184, 307, 180

[56] References Cited

UNITED STATES PATENTS

| | | | |
|---|---|---|---|
| 2,415,405 | 2/1947 | Barney | 318/184 |
| 3,238,432 | 3/1966 | Amberger | 318/184 X |
| 3,500,157 | 3/1970 | Goto | 318/184 X |
| 3,593,078 | 7/1971 | Domshy et al. | 318/180 |

*Primary Examiner*—Donovan F. Duggan
*Attorney, Agent, or Firm*—Raymond E. Smiley; Edward J. Norton

[57] ABSTRACT

Passive or active networks responsive to changes in motor drive current alter the motor drive voltage or phase to damp hunting of the motor.

2 Claims, 25 Drawing Figures

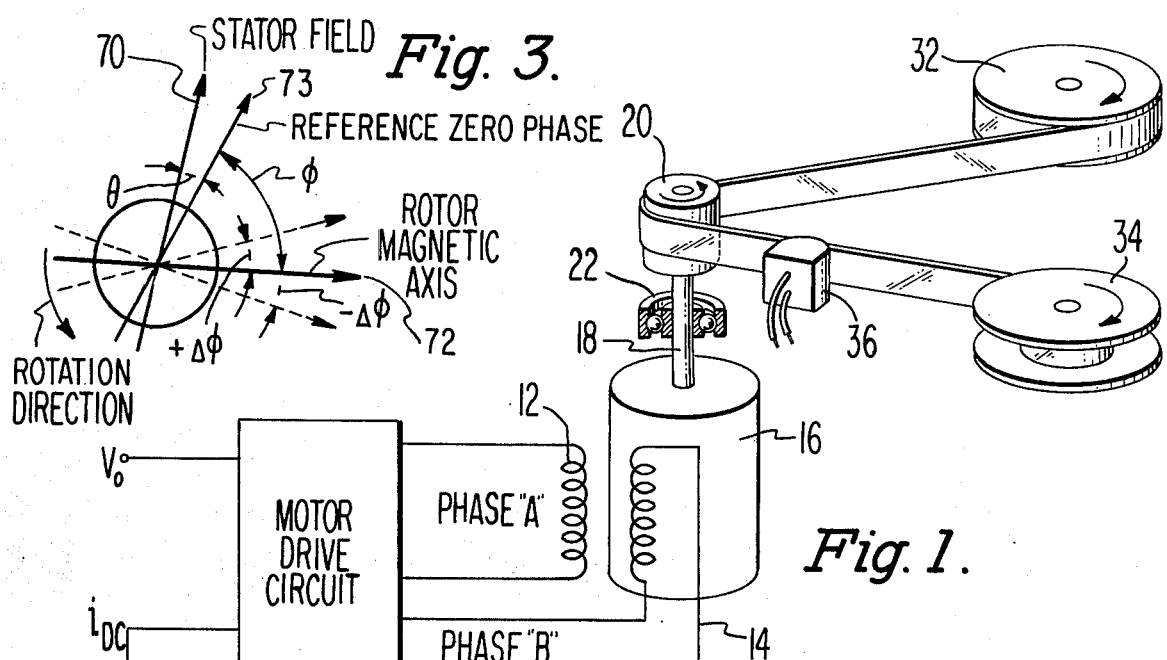
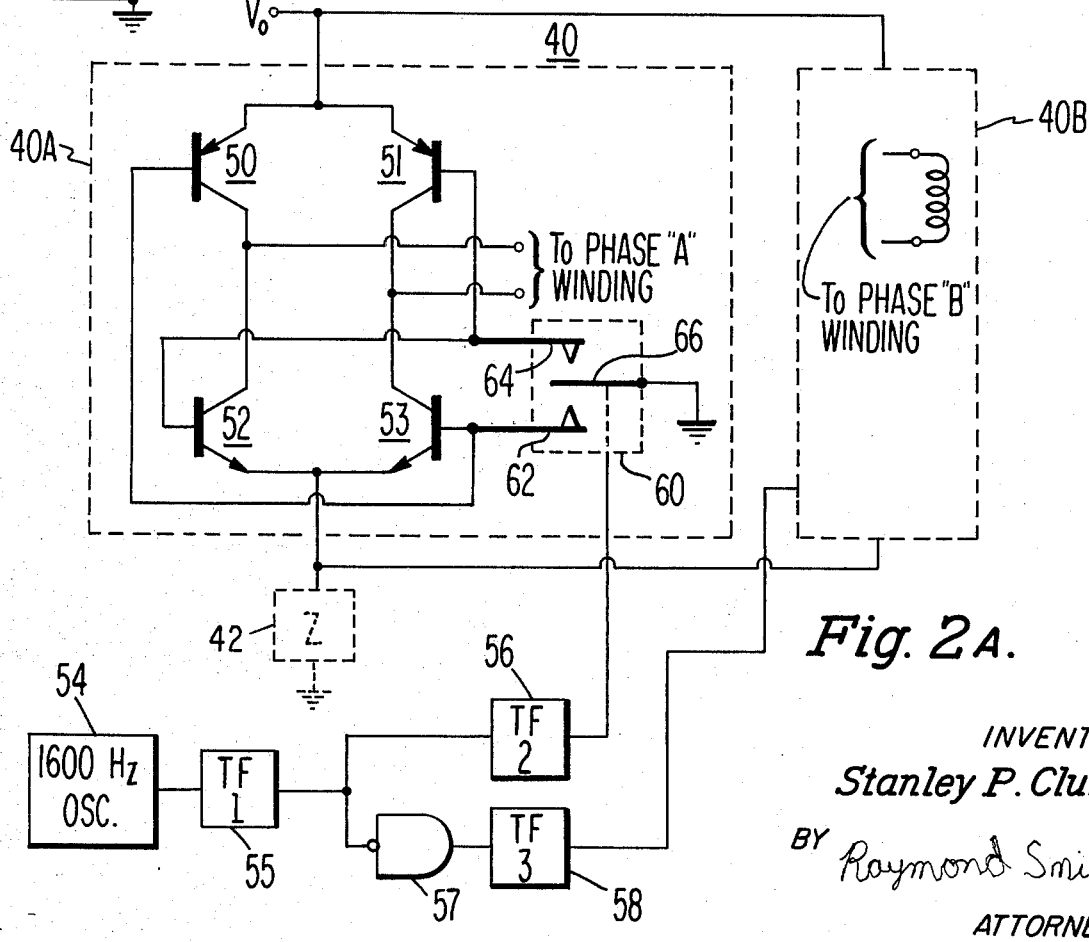
Fig. 3.
Fig. 1.
Fig. 2A.
INVENTOR.
Stanley P. Clurman
BY Raymond Smiley
ATTORNEY INVENTOR
Stanley P. Clurman
BY
Raymond Smiley
ATTORNEY $$\frac{di}{dt} = -k_a \frac{d\phi}{dt} + k_v \frac{dV_1}{dt}$$

3,988,653

REDUCTION OF HUNTING IN SYNCHRONOUS MOTOR

STATEMENT

The invention desribed herein was made in the performance of work under a NASA contract and is subject to the provisions of Section 305 of the National Aeronautics and Space Act of 1958, Public Law 85-568 (72 Stat. 435; 42 U.S.C. 2457).

This is a continuation-in-part of my copending application Ser. No. 133,572, filed Apr. 13, 1971, now abandoned.

BACKGROUND OF THE INVENTION

"Hunting," or small random excursions of the rotor in a synchronous motor, is a long known phenomenon. While driving a constant torque load, the rotor motion may have superimposed on its steady synchronous speed a meandering of its rotor phase angle about that of the constant rotating field vector. This excursion is usually oscillatory with a characteristic period, but may have an amplitude and phase which vary randomly. Small synchronous motors which are used in timing and recording devices often display this behavior. The consequent time displacement error may be objectionable or even intolerable in certain precision applications, notably in tape drive motors for video tape recorders.

In the prior art, changes in motor speed have been detected by a tachometer attached to the motor shaft. The output of the tachometer is then fed back through suitable electronic devices to alter the motor driving signals in a sense to reduce the hunting. Another approach is to feed a voltage proportional to the motor oscillations to an eddy current torque brake which acts to apply a varying amount of torque to the motor to reduce the hunting. Each of these prior art systems suffers from a response lag since a mechanical action must take place either to determine the presence of the hunting or to reduce it. This slows down the rate of recovery which may, in critical operations, be unacceptable. Further, in this approach the additional equipment required to sense very small velocity changes and to develope the damping torque is in itself complex and expensive.

BRIEF DESCRIPTION OF THE DRAWING

FIG. 1 is a block and schematic showing of a tape drive system employing a synchronous motor;

FIG. 2a is a schematic drawing of a motor drive circuit suitable for the motor of FIG. 1;

FIGS. 2b through 2j show waveforms present at various points in the circuit of FIG. 2a;

FIG. 3 is a vector diagram showing the relationship between the stator field and rotor magnetic axis in the motor of FIG. 1;

FIG. 5a is a schematic drawing of one type of impedance network suitable for use in damping the hunting of the rotor of FIG. 1;

FIGS. 5b and 5c are curves of impedance versus frequency which are useful in explaining the operation of the circuit of FIG. 5a;

SUMMARY OF THE INVENTION

Figure 2:
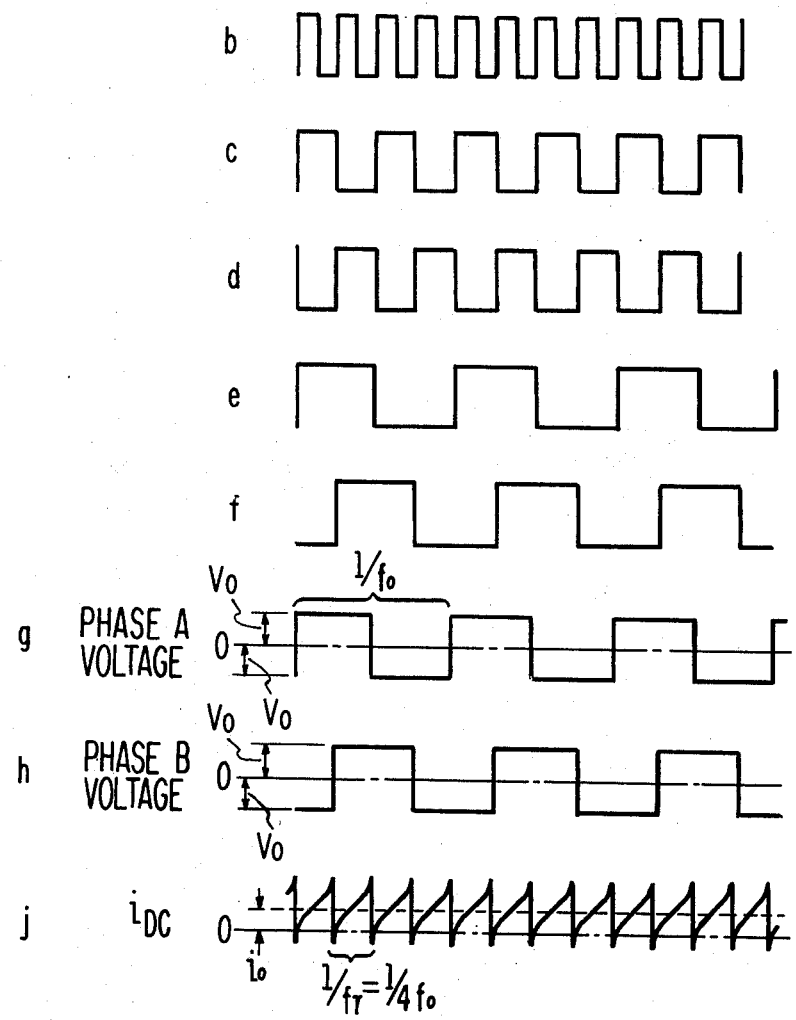

A synchronous motor comprising a stator portion and a rotor portion is characterized in that the rotor may oscillate about an average angular position relative to the field of the stator as the rotor rotates. Passive or active networks responsive to changes in a parameter of motor drive current alter the motor drive voltage or phase to damp hunting of the rotor.

DETAILED DESCRIPTION

In FIG. 1 there is shown, somewhat schematically, a synchronous motor 10 which may be of the hysteresis type. The motor is shown as having two stator windings 12 and 14, but the number of windings is not critical. Rotor 16 is connected to a shaft 18 which in turn is connected to a capstan 20. The shaft is supported for rotation by a ball bearing assembly 22.

Such a motor may be adapted to drive a load such as a magnetic tape 30 from a pay-out reel 32 over capstan 20 to a driven take-up reel 34. A suitable read/write transducer 36 may be suitably positioned to read from or write audio and/or visual signals onto the tape.

The stator windings receive power from a motor drive circuit 40 to be described shortly. The motor drive circuit 40 is connected to a source of potential, $V_o$, and through an impedance 42 to a source of reference potential such as ground. $V_o$, in a preferred embodiment, is a direct voltage which supplies a current $i_{DC}$ to the motor drive circuit 40 and impedance 42. The interaction of $i_{DC}$ and impedance 42 is very significant as will be discussed later in the description. A capacitor $C_R$ connected across the impedance may be used to bypass ripple to the direct current as will be explained shortly.

FIG. 2a shows the details of the motor drive circuit 40. It includes a first section 40A for driving phase A and a second similar circuit 40B for driving phase B. As the two circuits are similar, only the details of 40A are shown. Circuit 40A comprises first and second PNP power transistors 50 and 51, the emitters of which are connected to potential source $V_o$. The collectors are connected respectively to the phase A winding and to the collectors of third and fourth NPN power transistors 52 and 53. The emitters of transistors 52 and 53 are connected to impedance 42. The bases of first and fourth transistors 50, 53 are connected together and to one stationary contact 62 of a relay 60 which, while shown to have mechanical contacts, is preferably a solid state switch. The bases of second and third transistors 51 and 52 are connected together and to another stationary contact 64 of relay 60. The relay 60 may have its movable contact 66 alternately connected between the stationary contacts 62 and 64. The transistors connected to the stationary contact engaged by the movable contact are placed in their conducting state and the other two transistors are off. The relay may be driven at the rate of 400Hz by an oscillator circuit which is common to both sections 40A and 40B. The oscillator circuit may comprise an oscillator 54 which may, for example, be a crystal oscillator with a frequency of 1600Hz as shown in FIG. 2b. This is coupled to a first toggle flop 55 which toggles (changes state) in response to positive-going signals from the oscillator. Thus the output of toggle flop 55 is an 800Hz signal as illustrated in waveform c of FIG. 2. Toggle flop 55 is coupled directly to a second toggle flop 56 and via inverter 57 to a third toggle flop 58. These toggle flops also change their state in response to positive-going signals. The waveforms at the outputs of inverter 57 and of toggle flops 56 and 58 are shown respectively in waveforms d, e and f of FIG. 2. The output of toggle flops 56 and 58 are 400Hz signals, the output of element 58 lagging the output of 56 by 90°. Toggle flop 56 is coupled to relay 60 in drive circuit 40A. Toggle flop 58 is coupled to a similar relay in drive circuit 40B which is identical to section 40A. The emitters of transistors 52 and 53 in circuit 40B (Phase B) are connected to impedance 42 in the same way as circuit 40A.

In the discussion of the operation of the circuit 40 which follows, the waveforms g through j of FIG. 2 should be referred to. Assuming that relay terminals 62 and 66 are connected, transistors 50 and 53 will be rendered conductive. Therefore, current will pass from source $V_o$ through transistor 50, through stator winding A in one direction, through transistor 53 and then through impedance 42 to ground. After one-half a cycle, the output of the toggle flop 56 causes contact to be made between terminals 64 and 66 rendering transistors 51 and 52 conductive and transistors 53 and 50 nonconductive. Then current passes from source $V_o$ through transistor 51 through the stator winding A in the opposite direction through transistor 52 through impedance 42 to ground. Circuit 40B applies current in similar fashion to stator winding B except that the phase of the current supplied to the phase B winding lags the current supplied to the A winding by 90°.

Waveform g of FIG. 2 shows the voltage as it appears at winding A. Waveform h of FIG. 2 shows the voltage delayed by one-fourth cycle as it appears at winding B. The voltage is shown to have a frequency, $f_o$, equivalent, for example, to 400Hz and a voltage (plus or minus) equal to $V_o$. Actually the voltage is slightly less than $V_o$ due to the transistor drops, but this may be neglected for practical purposes. The current $i_{DC}$, as illustrated in waveform j of FIG. 2, operates about a steady value $i_o$ and has a ripple frequency $f_r$ equal to four times the driving voltage frequency, $f_o$. The ripple current may be bypassed by $C_R$ (FIG. 1).

A motor of the type described, while producing a constant torque, operates at a constant average speed. FIG. 3 shows the relationship between the stator field, illustrated as line 70, the rotor magnetic axis, illustrated as unbroken line 72, and a reference zero phase vector line 73, where line 70 is at angle $\theta$ to line 73 and line 72 is at angle $\phi$ to line 73. In theory, the rotor magnetic axis lags the stator field by a constant angle for a constant torque which may be labeled $\phi_o$. The stator field, in most general terms, will have a phase angle $\theta$, with respect to some reference. When the stator field is at constant phase and frequency, $\theta$ may be considered zero (i.e., lines 70 and 73 coincide). Actually, the occurrence of hunting causes momentary changes in torque such that the instantaneous angle $\phi$ is equal to $\phi_o \pm \Delta\phi$ as shown by dotted lines on either side of a line 72. In fact, $\phi$ is substantially proportional to torque $$\phi \alpha T \tag{1}$$

Further, as is also known to those skilled in the art, the direct current, $i_{DC}$, in a motor operated efficiently, is also substantially proportional to torque $$i_{DC} \alpha T \tag{2}$$

It therefore follows from formulas 1 and 2 that $$i_{DC} \alpha \phi \tag{3}$$

A motor used to drive magnetic tape such as illustrated in FIG. 1 is subject to torque pertubations (i.e., small temporary changes in torque). These torque pertubations might by caused by a number of things such as, for example, dirt in bearing 22 (FIG. 1) or a binding of the tape at the pay-out reel 32 or tape-up reel 34. Such pertubations are known to cause "hunting," a sinusoidal oscillation of the rotating magnetic axis about its average angle, $\phi_o$. Since the rotor phase angle has a value $\phi$, proportional to torque, T, it may be considered to be compliantly coupled to the stator field by a torsional spring with a stiffness $k_T$. The dynamic interaction of the rotor compliance and the rotor inertia, I, results in an oscillatory system with a natural resonant frequency, $f_n$, and is determined by the equation $$f_n = \frac{1}{2\pi}\sqrt{k_T/I} \tag{4}$$

Figure 4:
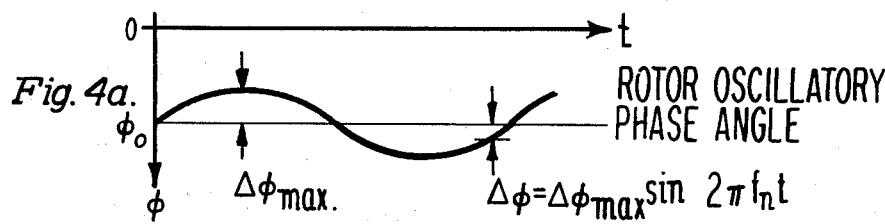
FIG. 4 is a drawing of the waveforms present in the circuit of FIG. 1.
Figure 4:
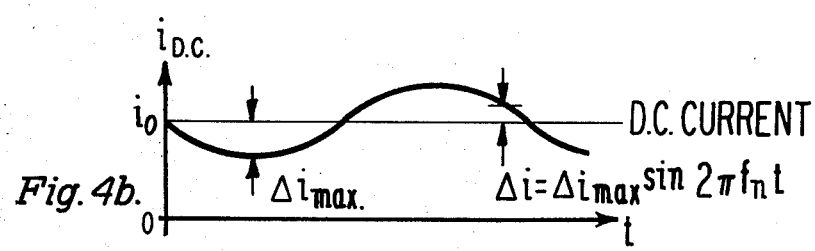
Figure 4:
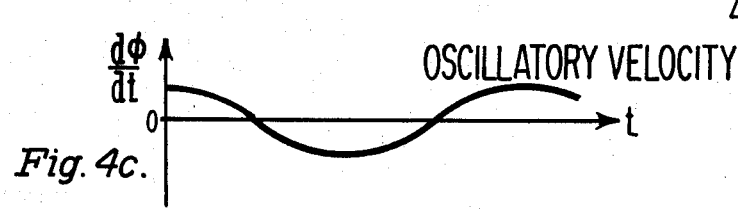
Figure 4:
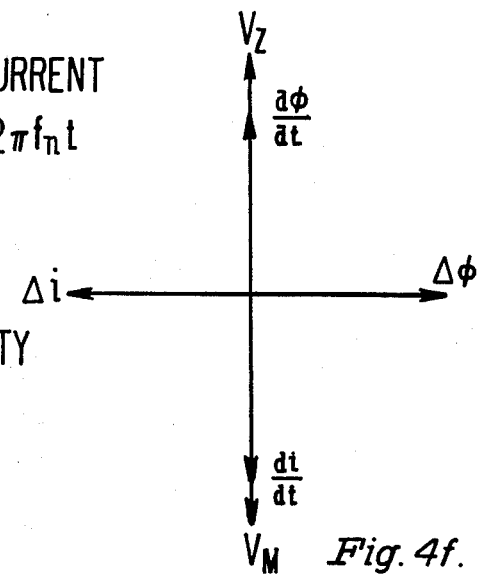
Figure 4:
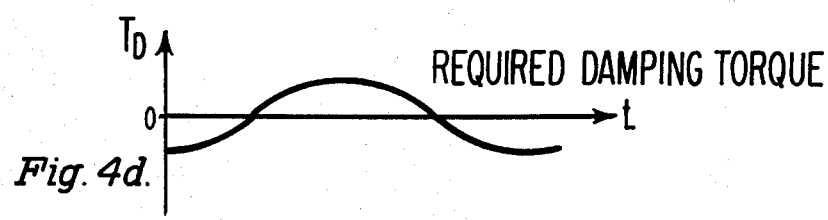
Figure 4:
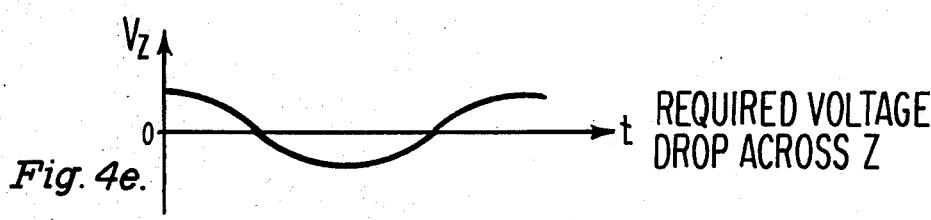

Waveform a of FIG. 4 shows the relationship above. The negative sign of $\phi_o$ is established when it is remembered that the rotor magnetic axis lags the stator field which is assumed to be a reference. At each instant in time the rotor is at an angle $\Delta\phi$ relative to $\phi_o$ and is determined by the equation:

$$\Delta\phi = \Delta\phi_{max}\sin 2\pi f_n t \tag{5}$$

The frequency $f_n$ is small when compared to the driving frequency of the motor, $f_o$. Frequency $f_n$ may be on the order of 10Hz; $\Delta\phi_{max}$ may vary between a fraction of a degree to about 10° and $\phi_o$ may vary from zero to about 60°, increasing with increasing loads. Waveform b shows the direct current $i_{DC}$ supplied to the motor drive circuit of FIG. 1. $i_{DC}$ is the instantaneous sum of $i_o$, the average current, and $\Delta i$, the variation about $i_o$, where $$\Delta i = \Delta i_{max}\sin 2\pi f_n t \tag{6}$$

From Formula 1 it is known that the lag angle decreases as torque decreases. Therefore, the required driving current decreases so that $\Delta i_{max}$ and $\Delta\phi_{max}$ occur at the same point in time. Waveform c shows the oscillatory velocity or rate of change of $\phi$, $d\phi/dt$. The sign of $d\phi/dt$ is established when it is remembered that $\phi$ is a lagging angle or negative displacement. The importance of this waveform becomes apparent when it is recalled that, as is well known in linear vibration theory, the damping torque required to reduce the oscillations of a mass (i.e., the rotor) is proportional to the velocity of that mass (not the displacement) and the two are 180° out of phase. This waveshape is shown at waveform d. Therefore, if the damping torque of waveform d can be developed, the rotor will maintain the desired angle $\phi_o$.

Normally, hysteresis motors are considered to be constant speed devices which, in the synchronous mode, operate independently of voltage. However, in fact a change in driving voltage will influence the rotor phase angle. The inventor has discovered that, for the class of motors described, instantaneous rotor phase angle is a relatively linear function of voltage for a constant torque load, over small voltage variations. The required damping torque, then, may be developed if the AC voltage supplied to the stator windings varies in direct proportion to the damping torque curve of FIG. 4d. The AC voltage, in an absolute sense, in turn is equal to the DC voltage delivered to the motor drive circuit. The direct voltage $V_M$ at the motor drive circuit is equal to $V_o - V_z$ where $V_z$ is the voltage drop across impedance 42 (FIG. 1).

The voltage drop across an ideal impedance which will produce the required damping torque is shown in waveform $e$. FIG. 4f is a vector diagram which, in a sense, summarizes the data presented in waveforms $a$ through $e$ of FIG. 4. It shows the phase relationship between the changes in rotor angle $\Delta\phi$, changes in current $\Delta i$, the derivatives of the two, $V_z$, the voltage drop across $z$, and $V_M$, the voltage drop across the motor circuit 40. Since the current is 180° out of phase with rotor angle, the derivative of the current is also 180° out of phase with the rotor velocity. The ideal $V_z$ is proportional to $di/dt$ and lags $i_{DC}$ by 90° for an efficient motor. As will be seen below, by utilizing a proper impedance element 42 (FIG. 1) the proper voltage drop across the stator windings may be developed to reduce the hunting action.

From waveforms $b$ and $e$ of FIG. 4 it can be seen that in the required impedance 42, the current leads the voltage by 90°. A capacitor has this relationship, however, the impedance of the capacitor decreases with increasing frequency. Therefore, the maximum positive and negative excursions of $V_z$ would decrease in an absolute sense with increasing frequency. Since $V_M = V_o - V_z$ and since $V_o$ is fixed, the maximum positive and negative excursions of voltage would decrease with increasing frequency. This is undesirable since at higher frequencies, a higher damping torque is required which means higher voltage swings are required.

A negative inductor would be characterized by the voltage lagging the current and by increasing impedance with increasing frequency. This device is of course unattainable. It may, however, be approximated when one again considers the motor to be like a torsional spring. It is known that a given motor with a given inertia has a given and determinable natural resonant frequency of oscillation, $f_n$, as expressed in equation (4). Therefore, a circuit can be developed that has a negative impedance over a small range about that natural frequency. FIG. 5a illustrates a suitable impedance comprising a parallel combination of a resistor 76 and a capacitor 78. Such a circuit has an impedance.

$$z = \frac{R - j\,2\pi f R^2 C}{1 + (2\pi f)^2 R^2 C^2} \qquad (7)$$

That is, it has a real portion $$\frac{R}{1 + (2\pi f)^2 R^2 C^2} \qquad (8)$$

illustrated at FIG. 5b and an imaginary or quadrature impedance portion $$\frac{-j\,2\pi f R^2 C}{1 + (2\pi f)^2 R^2 C^2} \qquad (9)$$

illustrated in FIG. 5c. An ideal negative impedance line is shown dotted for comparison. This negative portion has a maximum negative value which may be determined by differentiating formula (9) with respect to $f$. This peak occurs where $$f = \frac{1}{2\pi RC} \qquad (10)$$

Once the natural frequency is known and a suitable resistor R value is selected, the value of C can easily be determined. The circuit of FIG. 5a has the advantage of simplicity, inexpensiveness and the fact that the capacitor 78 can also act to bypass the ripple current. Unfortunately, the inphase component of the impedance dissipates power. This may be undesirable, particularly in a low power device such as a portable video recorder.

A second circuit configuration which accomplishes the damping more efficiently, is shown in FIGS. 6a and 6b. This is a parallel LCR circuit comprising a resistor 76, a capacitor 78 and an inductor 80. This circuit has its own resonant frequency below the resonant frequency $f_n$ of the motor. FIGS. 6c and 6d show respectively the inphase and imaginary components of the impedance of FIGS. 6a and 6b. It is desired to have the maximum negative reactance occur at the rotor resonant frequency, $f_n$. For typical circuits this will occur when $$\frac{1}{2\pi\sqrt{LC}}$$

is approximately 5 percent less than $f_n$, the exact amount being dependent on the relative value of R. A detailed mathematical treatment is deemed not necessary as this information is available in basic circuit texts and is similar to that described in connection with FIG. 5. This circuit has the advantage over that shown in FIG. 5a in that the real portion of the impedance is at a relatively low value at or near the resonant frequency and also at zero frequency thus keeping power dissipation in $V_z$ to a minimum.

Figure 7:
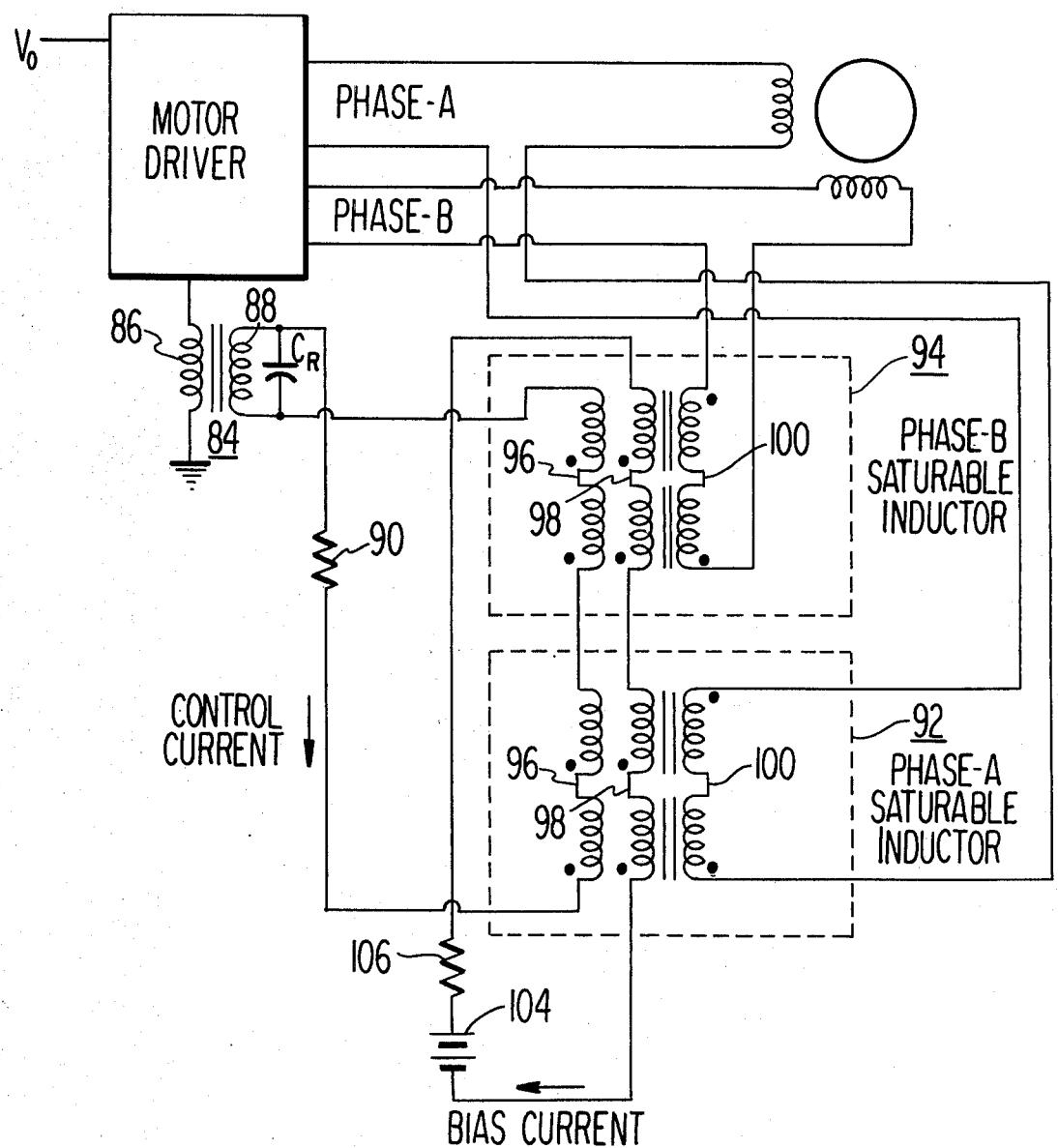
FIG. 7 is a schematic showing of a motor control circuit which employs another impedance circuit.

FIG. 7 shows yet another motor damping circuit. A transformer 84 has a primary winding 86 in the DC current path of the motor drive circuit. The secondary 88 of the transformer is series coupled to a limiting resistor 90 and control windings 96 of two saturable inductors 92 and 94. A bias winding 98 in each of the saturable inductors is series connected to a source of bias potential 104 and a limiting resistor 106. A third set of windings 100 in inductor 92 is connected in series with the phase A motor winding. A similar set of windings 100 in inductor 94 is connected in series with phase B motor winding.

The purpose of transformer 84 is not to alter the voltage in the motor drive circuit, but rather to merely sense the current passing through the circuit, or more accurately the derivative, $di/dt$, of that current. Since the primary winding 86 of the transformer does not have to develop the $iZ$ voltage drop required for the damping torque, it can consequently be a physically smaller inductance. Damping is produced, not by varying the voltge supplied to the motor drive circuit as before, but by varying the impedance in series with the motor windings. This effectively alters the voltage at the stator windings. For small variations of series impedance, this will have a comparable effect to that of small voltage variations.

Since either a plus or minus current in the control windings, only, would only lower the impedance of windings 100, an effect is required to make this impedance change linear with the plus or minus control current. This effect is provided by the bias windings 98, which have a constant DC current. Now a plus or minus control current will increase or decrease the average impedance established by the bias current.

A capacitance $C_R$ across secondary winding 88 of transformer 84 acts to bypass the ripple frequency in the DC current as illustrated in waveform $j$ of FIG. 2. It may be of small electrical value and of small physical size. The inductor is not tuned as was the inductor of FIG. 6 so that its L-C resonance is higher than that of the rotor resonant frequency. The inductor is a normal "positive" inductance with its impedance voltage-drop always proportional to di/dt and leading the DC current by 90°. The required damping action is obtained by choosing the polarity of the control windings so that the impedance of the saturable inductors decreases as the DC current develops a positive di/dt. The damping action will now be equivalent to that of the ideal negative inductance shown as a dotted line in FIGS. 5c and 6d. The advantage of the circuit of FIG. 7 is that the reactor voltage and therefore impedance is affected at the motor frequency of, for example, 400Hz rather than the lower motor resonant frequency of, perhaps, 10Hz. This requires much smaller magnetic cores and therefore the saturable reactors may be physically small and of light weight. Further, the optimum lagging impedance component is obtained over the full frequency range by selecting the polarity of reactor winding connections rather than by approximately it over a narrow band through L-C tuning. Further, a physically large capacitor (such as capacitor 78 in FIGS. 5 or 6) is not required.

Figure 5:
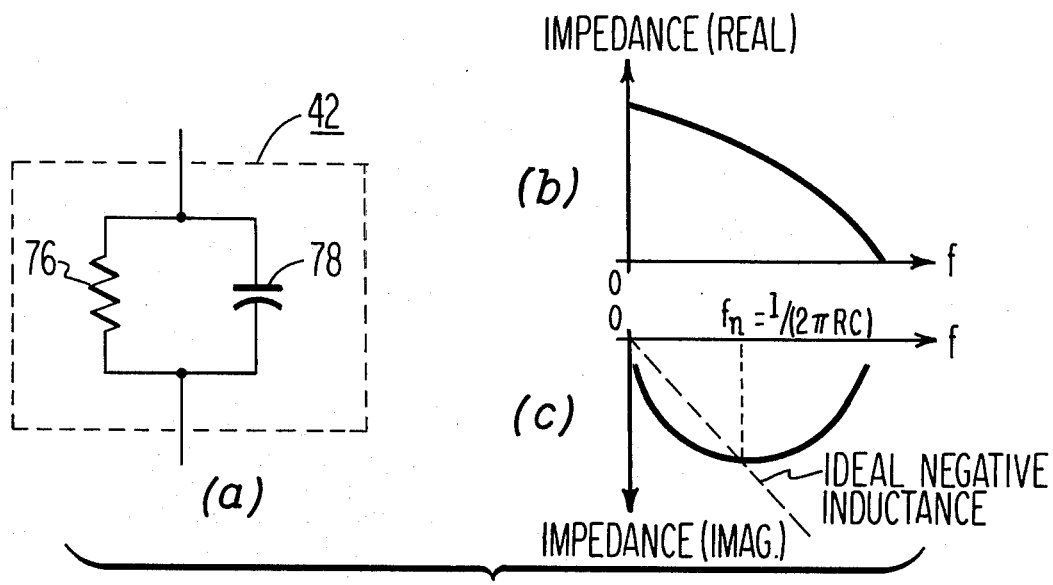
Figure 6:
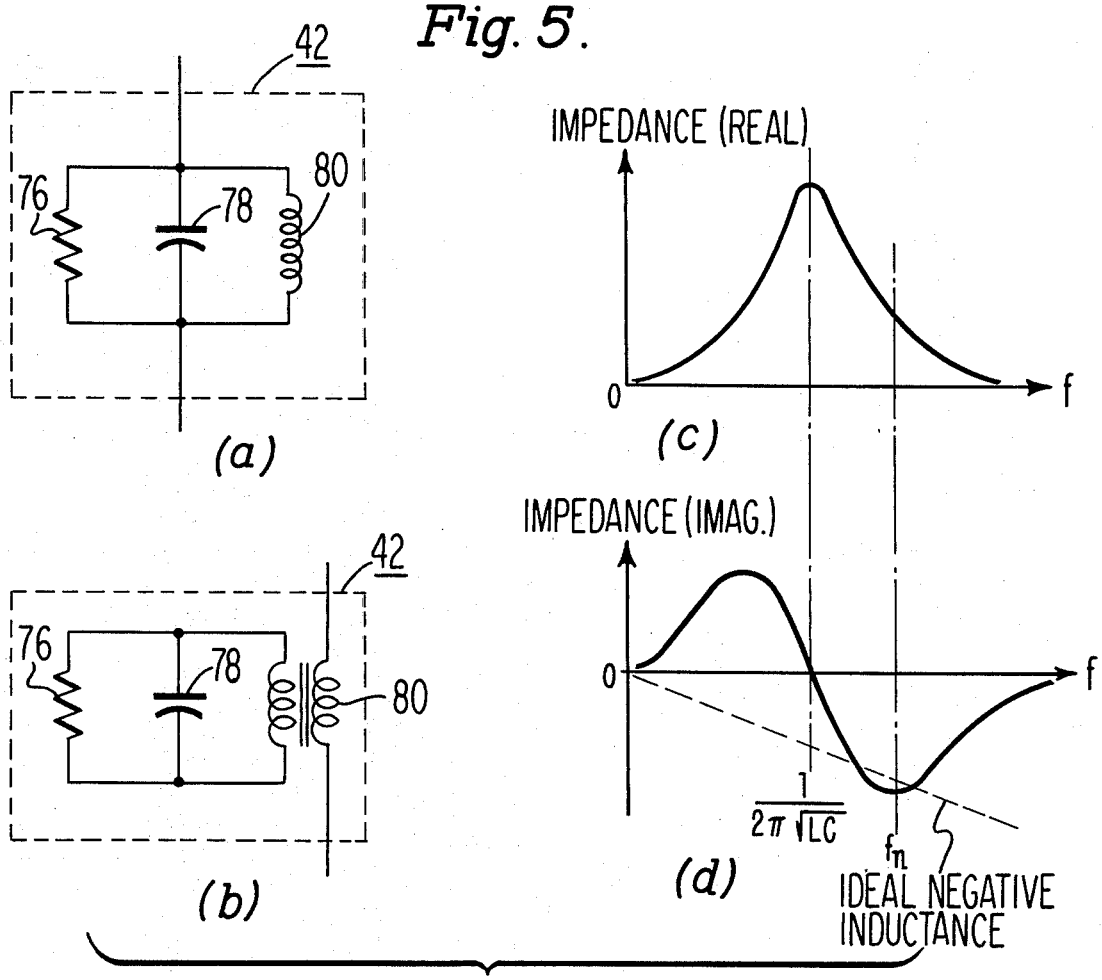
FIGS. 6a and 6b are schematic drawings of other impedance circuits useful in the circuit of FIG. 1.
FIGS. 6c and d are curves of impedance versus frequency of the circuits of FIGS. 6a and 6b.
Figure 8:
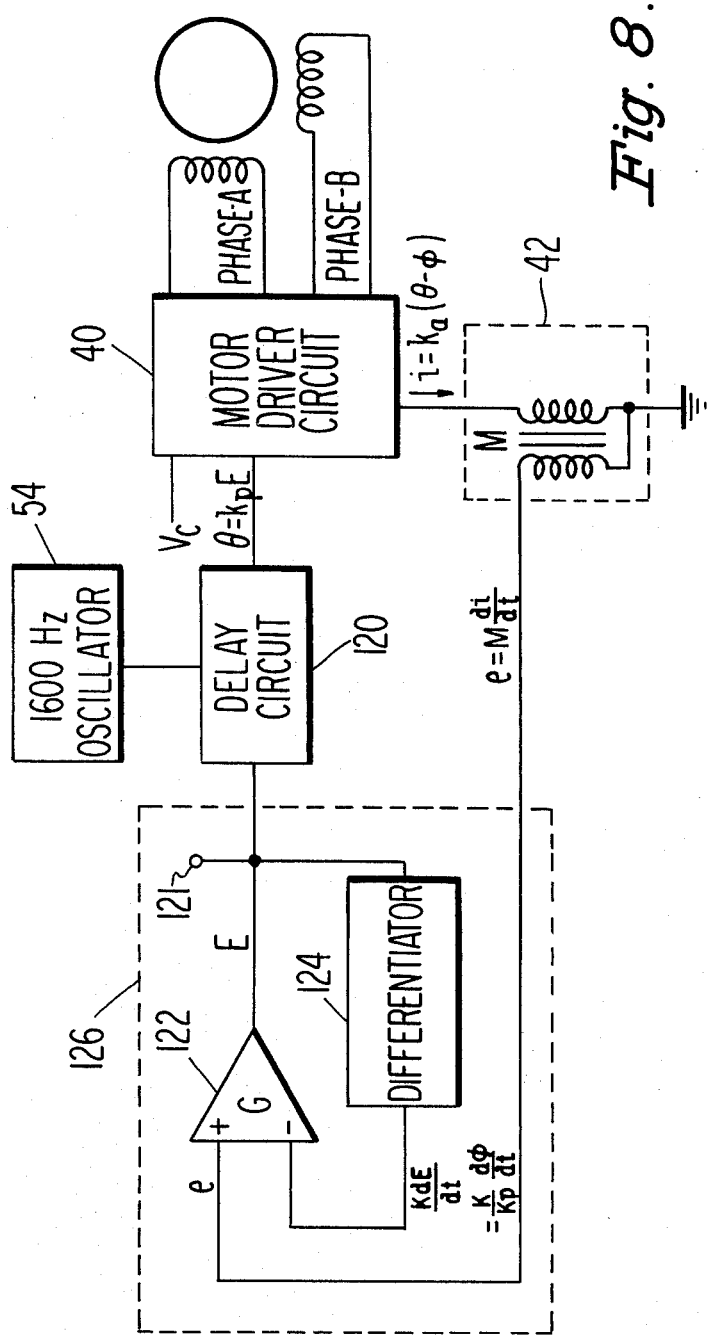
FIG. 8 is a block diagram of an alternate version of the circuit of FIG. 1.

The impedance circuits dealt with so far as illustrated in FIGS. 5, 6 and 7 have all been passive circuits and have all operated by varying an impedance in series with the motor or its drive circuit. The hunting action also may be damped by introducing a momentary phase shift $\theta$ of the stator field about the zero reference 73 of FIG. 3, as in FIG. 8. FIG. 8 shows a motor drive circuit 40 as illustrated and described in connection with FIGS. 1 and 2a feeding the two stator phases A and B of a synchronous motor. The 1600Hz source 54 shown in FIG. 2a as being contained within the motor drive circuit is here separated therefrom and instead of driving toggle flop 55, drives a voltage controlled delay circuit 120 which in turn drives toggle flop 55 in the motor drive circuit. Delay circuit 120 delays the leading edge of the pulses from the oscillator a nominal amount such as 1/16th of a period. Then positive and negative voltages applied to terminal 121 advance or retard proportionally the pulses from delay 120. Impedance 42 in the motor drive circuit direct voltage line is shown as a transformer, the secondary of which produces a voltage $e$. The secondary is connected as one input to a differential amplifier 122 having a gain G. The output of the differential amplifier labeled as a voltage E is coupled to the delay circuit 120 to determine the amount of delay in that circuit. The output of the amplifier is also coupled to a differentiator 124, which may be a conventional R-C differentiator. The output of the differentiator is coupled as a negative second input to differential amplifier 122. In the quiescent state (that is, the motor not hunting) the delay circuit will cause a 400Hz signal to be delivered to the motor drive circuit at zero reference angle. However, for the more general case, the current in the DC lines to the motor driver is proportional to the difference between the stator field phase angle $\phi$ and the rotor phase angle $\phi$ as illustrated by the vectors of FIG. 3. That is $$i_{DC} = k_a (\theta - \phi) \tag{11}$$

where $k_a$ is the motor angle-current transfer function. The DC current in the motor drive circuit passes through transformer 42 which develops a voltage in its secondary $e$ proportional to the derivative of current. That is $$e = M \, di/dt \tag{12}$$

where M is the mutual inductance of the transformer. Therefore $$e = M k_a \left( \frac{d\theta}{dt} - \frac{d\phi}{dt} \right) \tag{13}$$

Amplifier 122, in the absence of a signal from the differentiator 124, amplifies the signal $e$ to produce the signal E which is fed to the delay circuit. E effects a phase shift $\theta = k_p E$, where $k_p$ is the transfer function of the delay circuit. E is also proportional to $(d\theta/dt - d\phi/dt)$ if the amplifier input is only $e$. However, E acting on delay circuit 120 is required to be responsive solely to $d\phi/dt$. Therefore the $d\theta/dt$ term must be cancelled. That is the purpose of differentiator 14. The derivative of E, dE/dt, is proportional to $d\theta/dt$. Therefore, E equals the sum of the two inputs to the amplifier times the amplifier gain G, or $$E = (G \cdot e) - \left( G \cdot \frac{K}{k_p} \cdot \frac{d\theta}{dt} \right) \tag{14}$$

where K is an arbitrary constant. Substituting for $e$, $$M k_a \left( \frac{d\theta}{dt} - \frac{d\phi}{dt} \right),$$

$$E = \left( G M k_a \cdot \frac{d\theta}{dt} \right) - \left( G M k_a \cdot \frac{d\phi}{dt} \right) - \left( \frac{GK}{k_p} \cdot \frac{d\theta}{dt} \right) \tag{15}$$

By adjusting the output of the differentiator so that $G \cdot K/k_p = (GMk_a)$, or $K = (Mk_a k_p)$, the $\theta$ derivative is eliminated, leaving $E = -(GMk_a)d\phi/dt$. For practical closed loop stability, however, K cannot be less than $(Mk_a k_p)$ but it may be slightly (about 10 percent to 50 percent) greater. In summary, then, as soon as a change in DC current occurs indicative of the departure of the rotor magnetic axis from its nominal $\phi_o$, E acts on delay circuit 120 to appropriately advance or retard the stator field from its zero angle, thereby producing the proper damping torque to inhibit the hunting.

Figure 9:
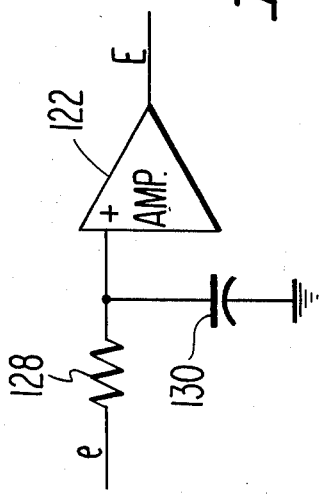
FIG. 9 is a block and schematic drawing of a modified portion of the circuit of FIG. 8.

FIG. 9 shows an alternate approach to the amplifier and differentiator of the circuit of FIG. 8. Here e is fed, not directly to amplifier 122, but rather through resistor 128 to the amplifier 122 and to a capacitor 130. The opposite end of capacitor 130 is connected to a source of reference potential, such as ground. When the R-C circuit has the value $(RC) = (GMk_a k_p)$, the amplifier output E will be identical to that of FIG. 8. For practical closed loop stability, however, (RC) should not be less than $(GMk_a k_p)$ and may be somewhat (about 10 percent to 50 percent) greater. The net result is an incremental torque proportional to $d\phi/dt$ and the motor hunting will be damped out.

Figure 10:
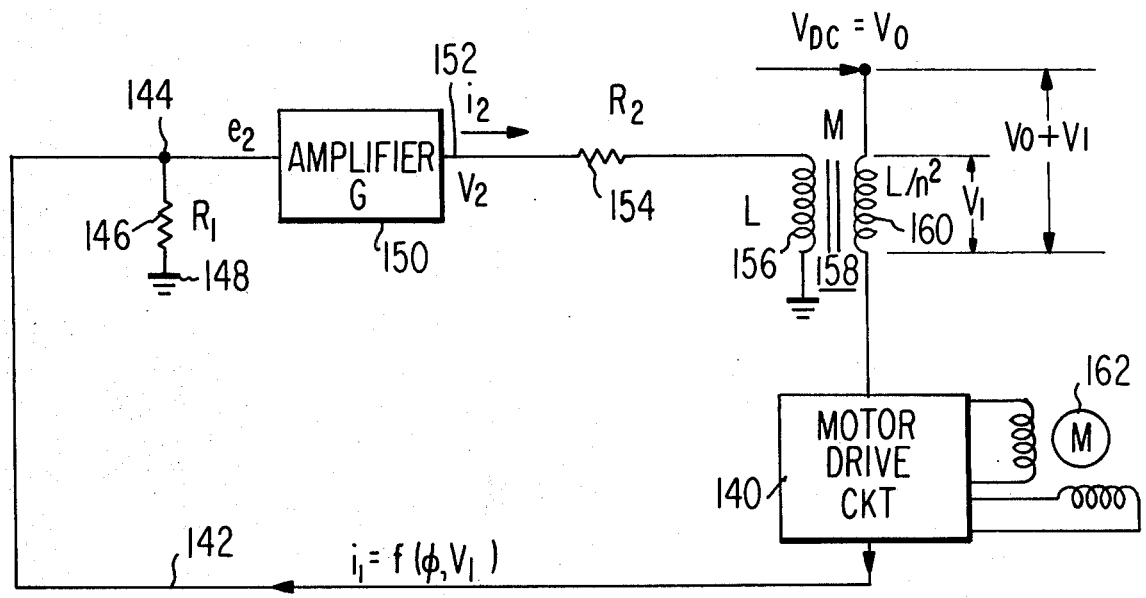
FIG. 10 is a block and schematic drawing of a further embodiment of a motor control circuit.

FIG. 10 is a further embodiment of a motor control circuit. As shown in FIG. 10, a voltage $V_o + V_1$ is applied to motor drive circuitry 140. The motor drive circuitry 140 may be of the type shown and described in connection with FIGS. 1 and 2. The motor drive current $i$, on lead 142 is coupled to one terminal 144 of a resistance $(R_1)$ 146. The other end of resistance 146 is coupled to a point of reference potential, shown as ground 148. The voltage $e_2$ at terminal 144 is the input signal to an amplifying device 150, which has a transfer function of G. The amplifying device 150 may include voltage amplifier and power amplifier portions, which provide an output voltage $V_2$ on lead 152. the voltage $V_2$ is coupled through a resistance $(R_2)$ 154 to the primary winding 156 of a transformer 158. The voltage $V_1$, which forms a portion of the voltage applied to the drive circuitry 140, is provided from $V_2$ by a secondary winding 160, through the transformer action of the transformer 158.

The circuit of FIG. 10 is effective to reduce motor hunting, by dynamically altering the magnitude of the voltage $V_o + V_1$ supplied to the motor 162.

To reduce hunting, a corrective torque is introduced to the motor 162, which is opposed to the hunting velocity $\dot\phi$, i.e. the rate of change of the rotor angle $\phi$. The corrective torque is developed by changing the DC supply voltage by $V_1$. Therefore, it is necessary to make $V_1$ proportional to $\dot\phi$, the hunting velocity.

An error signal $e_2$ is obtained by sensing the motor DC current $i_1$. However, $e_2$ is affected by both $\dot\phi$ and $V_1$. If $V_1$ were directlly proportional to $e_2$, a voltage would be applied to the motor which would be partly proportional to $\dot\phi$, but, which also would feed back $V_1$. By selecting given values for the time constant, provided by $R_2$ and L of the transformer, the $V_1$ feedback component of $e_2$ is substantially eliminated and a desired value of $V_1$ proportional to $\dot\phi$ is provided.

The equations further defining the operation of the arrangement of FIG. 10 are as follows:
using Laplace Transform notation:

$$V_1 = \frac{nLS}{R_2 + LS} V_2 = \frac{M}{R_2 + LS} SV_2$$

$V_1 (R_2 + LS) = MSV_2 = GMSe_2$
But, $e_2 = i_1 R_1$, and
$V_1 (R_2 + LS) = GMR_1 Si_1$
$Si_1 = -k_a S\phi + k_v SV_1$ where;
$k_a$ = constant relating a change in current $i_1$ with a change of rotor angle $\phi$ for constant voltage.
$k_v$ = constant relating a change in current $i_1$ with a change in voltage for constant rotor angle $\phi$.

Figure 11:
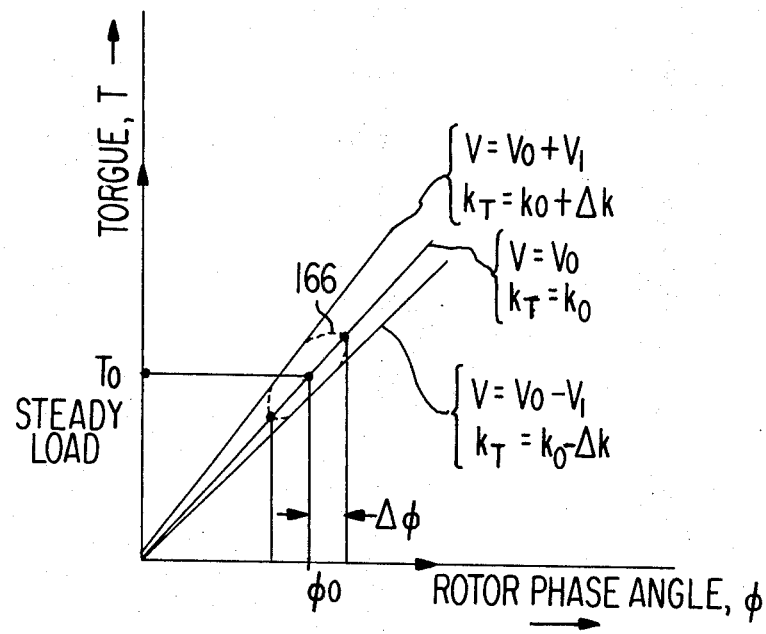
FIG. 11 is a graph showing the relation of motor torque as a function of rotor phase angle and applied voltage.

$V_1 (R_2 + LS) = GMR_1 (-k_a S\phi + k_v SV_1)$
$R_2 V_1 + LSV_1 = -(GMk_a R_1) S\phi + (GMk_v R_1) SV_1$
$R_2 V_1 = -(GMk_a R_1) S\phi + (G_h Lk_v R_1 - L) SV_1$ $$V_1 = -\left(GMk_a \cdot \frac{R_1}{R_2}\right) S\phi + \frac{L}{R_2}(Gnk_v R_1 - 1)S\dot V_1$$

when $(G_h k_v R_1) = 1$ then $V_1 = -\left(GMk_a \frac{R_1}{R_2}\right) \frac{d\phi}{dt}$ The damping phenomenon of the motor is seen when it is considered that the synchronous motor behaves like a torsion spring with a torsional stiffness, $k_T$. The plot of FIG. 11 relates the motor torque to rotor phase angle $\phi$ and applied voltage, with the dashed line portion 166 indicating the locus of operation on the motor curves. The torsional stiffness $k_T$ varies with voltage so that:

$$k_T = k_o \frac{V}{V_o} = k_o \frac{V_o + V_1}{V_o} = k_o \left(1 + \frac{V_1}{V_o}\right) = k_o + \Delta k$$

where:

$$\Delta k = k_o \frac{V_1}{V_o}$$

and $k_o = k_T$ for a constant supply voltage.

When the motor drives a steady load, $T_o$, with a steady phase angle $\phi_o$, the differential equation of motion about $\phi_o$ is
$J\ddot\phi + K_T \phi = -T_o$
$J\ddot\phi + (k_o + \Delta k)(\phi_o + \Delta\phi) = T_o$
where:
J = Moment of Inertia of the rotating system
$T_o$ = steady torque load = $k_o \phi_o$ $$J\ddot\phi + k_o\phi_o\left(1 + \frac{\Delta k}{k_o}\right) + k_o \Delta\phi \left(1 + \frac{\Delta k}{k_o}\right) = T_o$$

since $k_o \phi_o = T_o$ $$J\ddot\phi + T_o \frac{\Delta k}{k_o} + k_o \Delta\phi \left(1 + \frac{\Delta k}{k_o}\right) = 0$$

This is a non-linear differential equation. When $\Delta k/k_o$ varies periodically with $\Delta\phi$, and is small, for example less than 0.1, the last equation can be closely approximated by the following:

$$J\ddot\phi + T_o \frac{\Delta k}{k_o} + k_o \Delta\phi = 0$$

but $\frac{\Delta k}{k_o} = \frac{V_1}{k_o}$, therefore $$J\ddot\phi + \frac{T_o}{V_o} V_1 + k_o \Delta\phi = 0$$

From the equations for the transformer coupled circuit of FIG. 10, $$V_1 = -\left(GMk_a \frac{R_1}{R_2}\right)\dot\phi.$$

Since $\phi$ has been referenced in the negative direction, the minus sign is dropped from $V_1$, and $$J\ddot\phi + \left(\frac{T_o}{V_o} GMk_a \frac{R_1}{R_2}\right)\dot\phi + k_o \Delta\phi = 0$$

This is the equation of a damped oscillation where the bracketed term is the damping coefficient.

Figure 12:
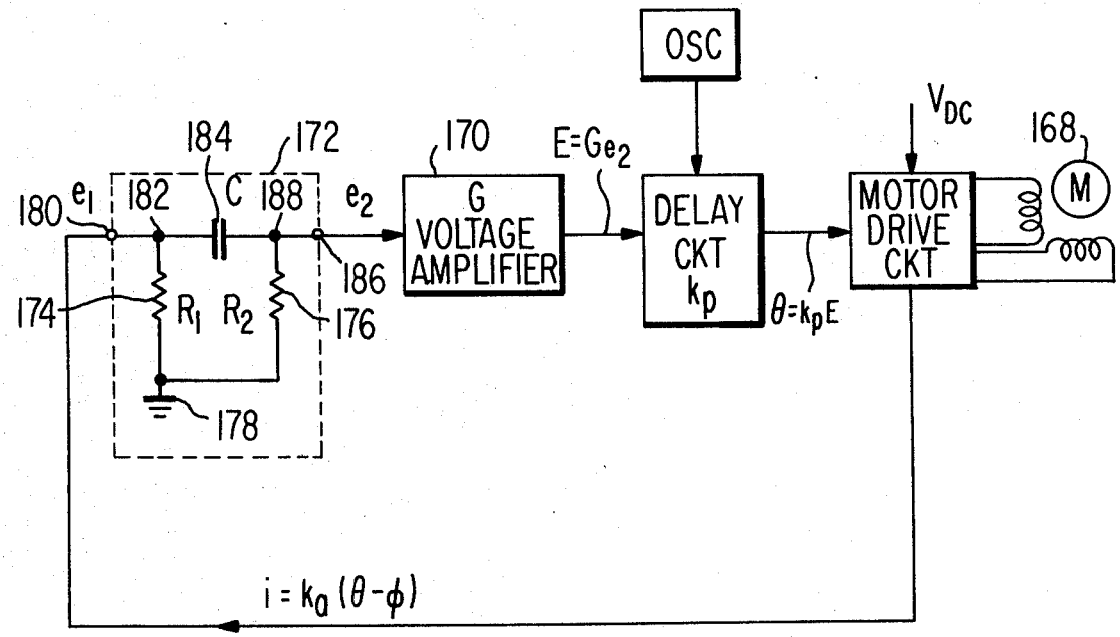
FIG. 12 is a block and schematic drawing of a further alternate version of the arrangements of FIGS. 8 and 9.

The circuit of FIG. 12 is effective to reduce motor hunting by altering the phase angle of the stator field $\theta$ of the motor 168, so as to induce a damping torque.

The arrangement of FIG. 12 operates to reduce hunting in the manner shown and described with respect to FIGS. 8 and 9.

In FIG. 12, the current through motor 168 is coupled to the amplifier 170 through an RC network, shown in dashed line box 172. The RC network comprises resistance ($R_1$) 174 and ($R_2$) 176. One end of the resistances 174 and 176 are coupled to a point of reference potential, shown as ground 178. The other end of resistance 174 is coupled to input terminal 180 and a first terminal 182 of a capacitance 184. The other end of resistance 176 is coupled to an output terminal 186 and a second terminal 188 of the capacitance 184.

In FIG. 12, the RC network of dashed line box 172, performs the equivalent function provided by the combination of the transformer circuit 42 of FIG. 8 with either, the input network of resistance 128 and capacitance 130 of FIG. 9, or the differentiator of dashed line box 126 of FIG. 8.

That is, it can be shown that the transfer function of the RC network of FIG. 12, will produce a signal $e_2$ which is substantially solely proportional to the hunting velocity $\dot{\phi}$, in a comparable manner described with respect to the circuitry of FIGS. 8 and 9.

This will be understood from a consideration of the following equations, in which $e_2$ is the input signal to amplifier 170. The relationship between $e_2$ and $i$, the motor current, using Laplace Transform notation is;

$$e_2 = \frac{(R_1 R_2 C) S_i}{(R_1 + R_2) CS + 1} \quad (1)$$

This can be rearranged and written so that, $$e_2 = (R_1 R_2 C) \left[\frac{di}{dt}\right] - (R_1 + R_2) C \frac{de_2}{dt} \quad (2)$$

$$\text{but: } \left[\frac{di}{dt}\right] = \left[k_a \frac{d\theta}{dt} - k_a \frac{d\phi}{dt}\right] = \left[Gk_a k_p \frac{de_2}{dt} - k_a \frac{d\phi}{dt}\right] \quad (3)$$

where;
$k_a$ = a change in motor current for a change in rotor angle $\phi$, for a constant stator angle $\theta$. $k_p$ = the transfer function of the delay circuit and describes the proportionality of the stator phase shift $\theta$ to the voltage E. Substituting equation (3) into equation (2) and rearranging shows;

$$E_2 = -(R_1 R_2 C k_a) \frac{d\phi}{dt} + (R_1 R_2 C) \left[(k_a k_p G) - \frac{(R_1 + R_2)}{(R_1 R_2 C)}\right] \frac{de_2}{dt} \quad (4)$$

when $\frac{(R_1 + R_2)}{(R_1 R_2 C)} = (k_a k_p C)$, the right hand term of equation (4) equals zero. Thus, $$e_2 = -(R_1 R_2 C k_a) \frac{d\phi}{dt}$$

This is an optimum damping signal, since $e_2$ is proportional to $d\phi/dt$.

This invention has been described in terms of a direct rather than alternating driving voltage.

Where the motor is driven directly from AC lines, there will, of course, not be DC current available as an indicator of rotor phase angle $\phi$. An equivalent signal may be obtained from a true wattage sensor placed in the AC lines. This wattage signal may be amplified to drive current through the primary of a transformer, the current being proportional to the wattage that was sensed. The voltage at the secondary of the transformer will be proportional to the derivative of the wattage and therefore proportional to the rotor hunting velocity. This signal is amplified and used to control saturable reactors similar to those in FIG. 7 or to vary the AC voltage to the motor and thus effect the damping torque.

What is claimed is:
1. In combination: a synchronous motor comprising a stator and a rotor characterized in that said rotor may oscillate about an average angular position relative to the field of said stator as said rotor rotates;
  electronic drive means responsive to a source of direct potential for producing an alternating signal coupled to said stator for causing said rotor to rotate;
  means responsive to changes in a parameter of said potential received by said drive means for producing a signal proportional to said parameter; and
  means coupled to said drive means and responsive to said signal proportional to said parameter for changing one of the amplitude and phase of said alternating signal in a sense to reduce hunting of said rotor.
2. In combination:
  a synchronous motor comprising a stator and a rotor characterized in that said rotor may oscillate about an average angular position relative to the field of said stator as said rotor rotates;
  means adapted to receive a direct current for producing alternating signals to drive said motor;
  current sensing means producing signals responsive to said current supplied to said means for producing said alternating signals; and
  means responsive to changes in said current sensing means signals coupled to said means for producing alternating signals for altering one of the amplitude and phase of said alternating signals thereby reducing the oscillation of said rotor.

* * * * *